March 18, 1969   B. E. BARICKMAN   3,433,105
APPARATUS FOR THE PRODUCTION OF MOLECULAR AND CRYSTAL MODELS
Filed April 7, 1966
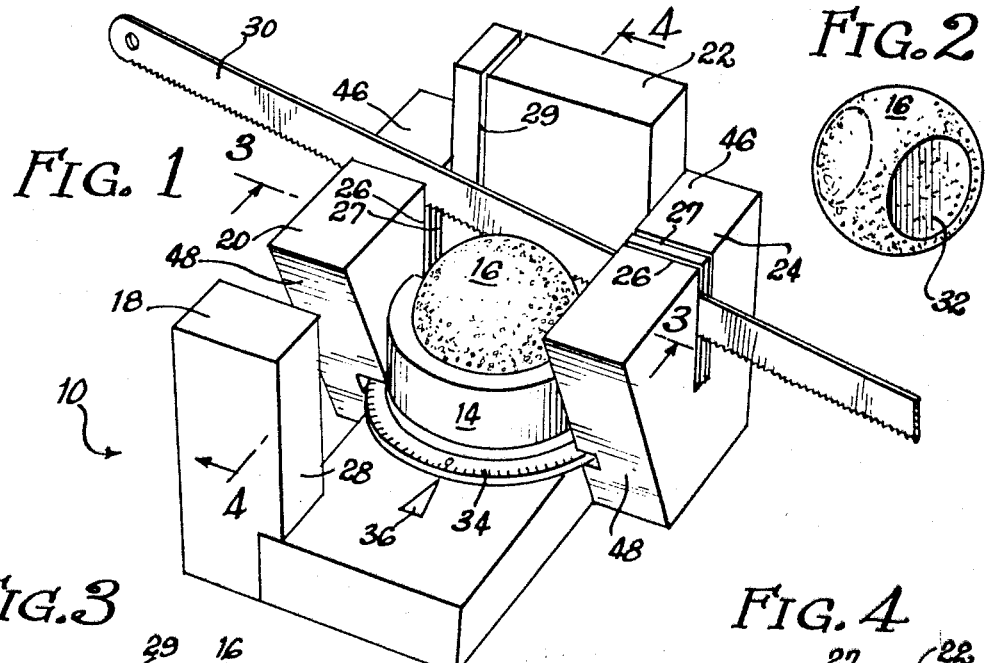
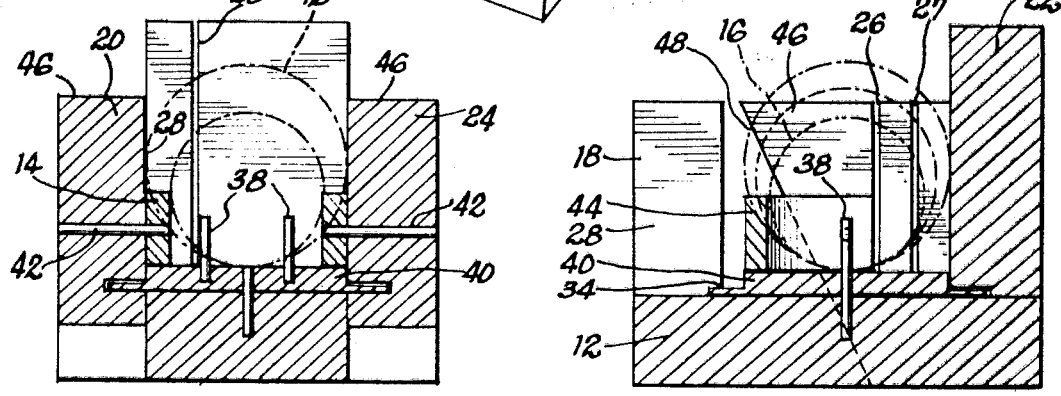
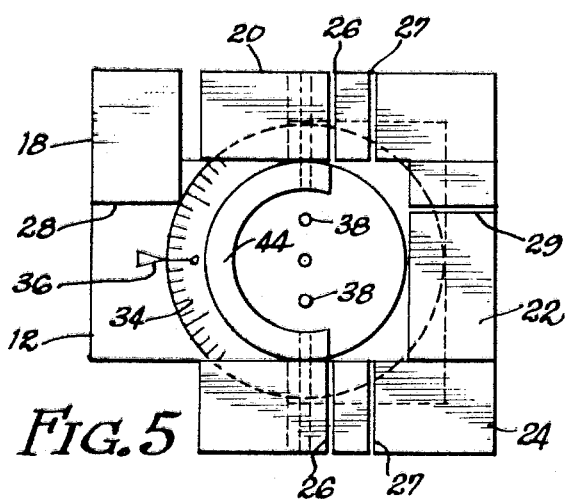
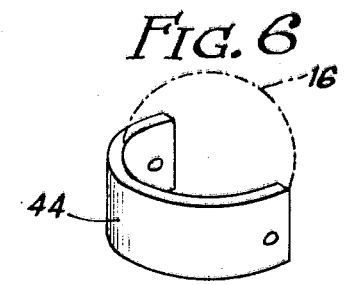
INVENTOR
Bert E. Barickman

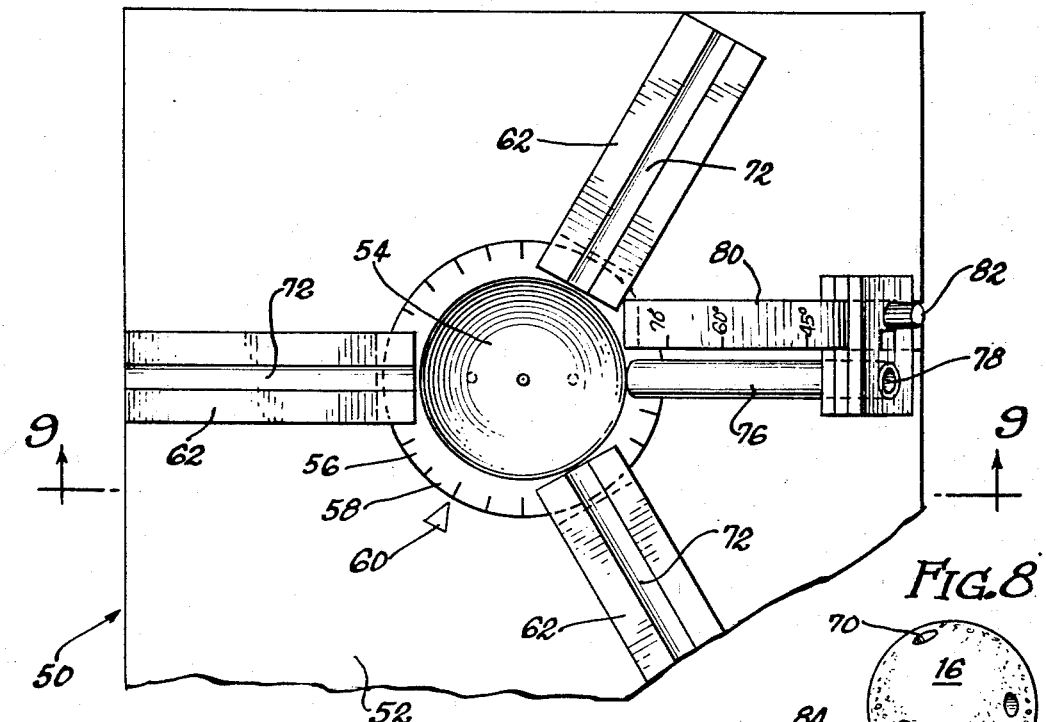
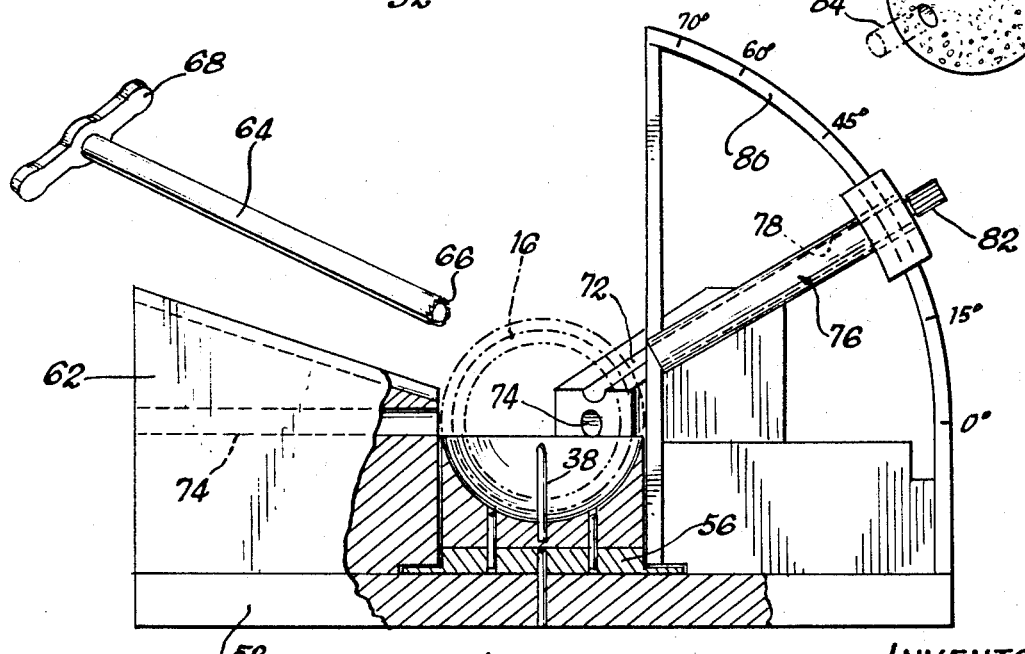

United States Patent Office 3,433,105
Patented Mar. 18, 1969

3,433,105
APPARATUS FOR THE PRODUCTION OF
MOLECULAR AND CRYSTAL MODELS
Bert E. Barickman, 1009 W. William,
Champaign, Ill. 61820
Filed Apr. 7, 1966, Ser. No. 540,872
U.S. Cl. 77—62          6 Claims
Int. Cl. B23b 43/00, 47/28, 49/00

ABSTRACT OF THE DISCLOSURE

A jig for use in the production of models, wherein generally spherical elements are assembled to form a composite arrangement. The jig includes a stationary base portion, a rotatably mounted cup portion, and a protractor attached to the cup portion whereby the angular position of the cup portion relative to the base can be determined. A plurality of guide members are mounted on the base in surrounding relationship relative to the cup member, and pins are provided for securing the spherical elements in place. The guide members serve to determine the type of cut made in the spherical elements.

---

This invention relates to a jig construction which is particularly suitable for use in the production of models made up of a plurality of generally spherical elements. In particular, the invention is applicable to the production of molecular and crystal models.

It is well-known that models illustrating molecular and crystal structures can be efficiently used as teaching aids and for similar applications. Such models may include a plurality of spherical elements having bores located in their periphery. Short stick members are provided whereby the ends of the stick members can be inserted at desired locations in the spherical elements. This permits the formation of a composite arrangement wherein each of the spherical elements represents an atom position. In this manner, three dimensional models can be readily prepared whereby molecular and crystal structures can be more readily visualized.

As an alternative technique, spherical elements are provided with flat faces which are adapted to abut with corresponding faces of other spherical elements. The elements can be arranged together in clusters to form the desired model.

The instant invention will be described with reference to the production of models of either of the types referred to. It will be understood, however, that other applications for the instant invention are contemplated. For example, it is conceivable that the techniques of this invention could be employed for building similar structures for amusement purposes.

It is a general object of this invention to provide an improved apparatus designed for the efficient and economical production of crystal and molecular models and for the production of similar constructions.

It is a more particular object of this invention to provide an apparatus which is uniquely suitable for the production of models which can be used as teaching aids for purposes of studying molecular and crystal structures.

These and other objects of this invention will appear hereinafter and for purposes of illustration, but not of limitation, specific embodiments of this invention are shown in the accompanying drawings wherein:

FIGURE 1 is a perspective view of a jig construction suitable for forming flat faces on spherical elements whereby a plurality of such elements can be fitted together for forming a model;

FIGURE 2 is an illustration of a spherical element modified through the use of the jig shown in FIGURE 1;

FIGURE 3 is a cross-sectional view of the jig construction taken about the line 3—3 of FIGURE 1;

FIGURE 4 is a cross-sectional view of the jig construction taken about the line 4—4 of FIGURE 1;

FIGURE 5 is a plan view of the jig construction illustrating the jig with the spherical element removed;

FIGURE 6 is a detail view of an adapter member utilized in the construction of FIGURE 1;

FIGURE 7 is a plan view of a modified form of the invention utilized in the formation of spherical elements employed in "ball and stick" models;

FIGURE 8 is a detail view of a spherical element produced with the construction of FIGURE 7; and FIGURE 9 is cross-sectional view taken about the line 9—9 of FIGURE 7.

The apparatus of this invention will be described with reference to the production of models. In such models, a plurality of generally spherical elements are assembled to form a composite arrangement. The models can be advantageously used for the production of molecular and crystal models which can be employed as teaching aids. Other applications of the invention are also contemplated.

The improvement of this invention specifically relates to a jig construction utilized for forming the spherical elements. The jig comprises a base portion, and holding means for the spherical elements are associated with the base portion. Forming means are also associated with the base portion, and means are provided for achieving relative movement between the forming means and the holding means. Accordingly, various angular relationships can be achieved between the forming means and the spherical elements in the holding means. This permits the production of a virtually limitless variety of spherical elements whereby any desired composite arrangement of the spherical elements can be achieved.

The jig construction of this invention may take the form illustrated at 10 in FIGURE 1. The jig includes a base member 12 having a holding means 14 associated therewith. The holding means is in the shape of a cup and is adapted to receive a spherical element 16.

A plurality of additional elements are associated with the construction for purposes of achieving forming of the spherical element 16. The elements comprise guide members 18 through 24. The members 20, 22 and 24 are provided with slots 26, 27 and 29 and the member 18 is provided with a guide face 28.

A cutting means 30 which may comprise a conventional hacksaw blade is employed for purposes of undertaking the cutting operation. As illustrated in FIGURE 1, the blade is adapted to be received in the slots 26. By undertaking a conventional sawing action, the blade can be made to slice off a piece of the spherical element 16 to form a flat face 32 on the element as is illustrated in FIGURE 2. Obviously, an assembly of the spherical elements 16 can be readily formed by mating the flat faces 32 of respective spherical elements.

The jig 10 is adapted to provide for the formation of any desired number of flat face portions. As will be explained, the angular relationship of the respective spheres in a composite can be critical when it is desired to provide accurate reproductions of molecular or crystal formations. The jig 10 provides means for achieving such accuracy since the cup member 14 has a protractor scale 34 associated therewith. The arrow 36 indicates the position of the cup member relative to the base and it will be obvious that one flat face can be formed on a spherical element and after rotating the holding means a desired number of degrees, an additional flat face can be formed. The faces will then have a desired angular relationship for purposes of preparing the composite arrangement.

In some instances, it is desirable to provide means for holding a spherical element 16 in position relative to the cup member 14. FIGURE 3 illustrates the provision of pins 38 which can be employed for this purpose. The pins are set in the bottom 40 of the cup member 14, and a spherical element 16 is adapted to be pressed down over these pins. For this purpose, and also to provide for cutting ease, it is desirable to use expanded plastic spherical elements.

In considering FIGURE 3, it will be noted that the side walls of the cup member 14 are dimensioned to accommodate a spherical element 16 of a particular size. Pins 42 can be employed for holding the side walls in place, and it will be apparent that removal of the pins will permit removal of the side walls. With this arrangement, a larger spherical element can be held in the construction, and in such a case, the elements 20 and 24, forming guide surfaces 46, will serve as side walls for the spherical element.

FIGURE 4 illustrates the use of the member 44 which is of smaller internal diameter than the side walls forming the cup member 14. Obviously a smaller spherical element 16 can be associated with this element 44.

As best shown in FIGURES 4, 5 and 6, the element forming the side walls of the cup member is generally circular in configuration but is provided with a cut-out portion. It will be obvious that the spherical element can be held in position by means of this side wall while at the same time, complete clearance is provided for the blade 30. It is important to note in this connection that the bottom wall 40 of the cup member carries the protractor scale, and this bottom wall moves relative to the side wall elements and relative to the slotted elements 20, 22 and 24. In this way, a fresh portion of the spherical element is positioned for cutting by the blade 30.

Where a side wall element 44 such as shown in FIGURE 6 is not employed, as in the case of the large spherical element shown in FIGURE 3, the clot 29 in the element 22 along with the guide face 28 can be employed for making a cut perpendicular to the cut being made in FIGURE 1. In addition, a cut across the top of a spherical element can be made by using the top surface 46 of the elements 20 and 24 as guide surfaces for the blade 30. Cuts can also be made by employing the inclined surfaces 48. Obviously, other slotted arrangements can be utilized where desired.

FIGURES 7 through 9 illustrate an alternative arrangement wherein a jig 50 is provided with a base portion 52 having a cup member 54 rotatably mounted thereon. This cup member is secured to a protractor carrying element 56. The position of the protractor 58 relative to the base is indicated by the arrow 60.

A plurality of guide elements 62 are located radially about the cup member 54. These guide elements are adapted to carry a boring tool 64 which may be a conventional cork borer. The cutting end 66 of the tool is adapted to be pressed against the surface of a spherical element 16, and when the tool is rotated by means of the handle 68, a bore 70 can be formed as illustrated in FIGURE 8. The grooves 72 in the guide elements serve to accurately align the boring tool.

It will be noted that passages 74 are provided in the guide members 62. The provision of these passages permits entry of the boring tool whereby additional holes can be formed in the spherical elements. Obviously, other passages 74 could be utilized where desired.

An additional guide element 76, which can be used alone or in conjunction with the illustrated elements 62, is illustrated. This element defines a passage 78 adapted to receive the boring tool. The element is movably mounted on the curved scale 80 whereby it can achieve a variety of angular positions with respect to the spherical element 16. A locking screw 82 is provided for setting the guide member 76 at a desired angle for a boring operation. It is contemplated that the supporting structure for the guide element 76 could be fixed to the base or movable around the cup member. In any case, relative movement between the cup member and the bore guides is accomplished whereby the spherical elements can be provided with bores at a variety of different angular positions. As shown in FIGURE 8, sticks 84 are adapted to be inserted in the bores for purposes of assembling a plurality of the spherical elements.

The following comprise examples of the use of the constructions disclosed above:

EXAMPLE I

In order to facilitate the description of the procedure for use of the jig 10 (FIGURES 1–6) in the construction of molecular models, the cutting guide surfaces and slots have been numbered. The following table relates cutting surface, bond type and sphere size.

| Surface | Bond type | Sphere diameter (in.) |
|---|---|---|
| 48 | $sp^3$ and $p^3$ | 2 |
| 46 | $sp^3$ | 2 |
| 26 | s, sp, $sp^2$, $p^3$, p | 1½ |
| 27 | s, sp, $sp^2$, $p^3$, p | 2 |
| 28, 29 | s, sp, $sp^2$, $p^3$, p | 1¾ |
| 27 | Carbon double bond | 2 |

The following description will be for a two-inch sphere; for other size spheres, the procedure is the same except that an insert must be used and that the cutting surfaces must be appropriate for the sphere size.

The protractor is first set at zero and the sphere inserted. An ordinary hacksaw blade serves as the cutting tool. It is helpful to steady the sphere while cutting and the cut should be made with a short stroke and with gentle pressure.

*Procedure for the seven basic bonding types*

I. "s" linear bonding.
   (a) For the "s" bond type, cutting guide surface 27 is used.
II. sp linear bonding.
   (a) For the "sp" bond, the first cut is along surface 27.
   (b) The sphere is then rotated 180° and the second cut is made along surface 27.
III. $sp^2$ triangular bonding.
   (a) Same as (a) of II.
   (b) The sphere is rotated 120° and the second cut is made along surface 27.
   (c) The sphere is rotated 120° and the third cut is made along surface 27.
IV. $sp^3$ tetrahedral bonding.
   (a) For the $sp^3$ bond, the first cut is made along surface 46.
   (b) The second cut is made along surface 48.
   (c) The sphere is rotated 120° and the third cut is made along surface 48.
   (d) The sphere is rotated 120° and the fourth cut is made along surface 48.
V. $p^3$ pyramidal bonding.
   (a) For the $p^3$ bonds, the first cut is made along surface 48.
   (b) Repeat (a) of II, rotating the sphere 120° between each cut.
VI. $p^2$ linear.
   (a) The same procedure as for the "sp" bond.
VII. p linear.
   (a) The same procedure as for the "s" bond.
VIII. The carbon double bond.
   (a) For the carbon double bond, the first cut is made along surface 48.
   (b) The sphere is rotated 120° and the second cut is made.
   (c) The sphere is rotated back 60° and third cut is made 27.
IX. Distortion of basic bond types.
   Any type of distortion can be represented by use of the protractor.

EXAMPLE II

As noted, the three fixed hole-borning guides (FIGURES 7–9) preferably contain two guides, 74 and 72, one parallel to the base, the other at an angle with the base. The parallel guides will be referred to as planer guides—the angled guides as the non-planer guides. The fourth hole-boring guide 76 has a single adjustable boring guide, which can be set at any angle from 0 to 75°. The holes are bored using a firm but gentle pressure while rotating the tool and inserting it as far as possible, and it is helpful to steady the sphere while boring. The protractor is set at 0 at the start of each operation.

*Procedure for the seven basic bonding types*

I. s linear bonding
   (a) Using any of the planer guides, insert the boring tool and bore the hole.
II. sp linear bonding
   (a) The same as (a) of I.
   (b) Rotate the sphere 180° and repeat (a) of I.
III. $sp^2$ triangular bonding
   (a) Bore three holes using all three of the planer guides.
IV. $sp^3$ tetrahedral bonding
   (a) Bore three holes using all three of the non-planar guides.
   (b) Remove the sphere and insert dowels into two of the holes.
   (c) With the empty hole down, gently insert the sphere in such a manner that the two dowels occupy two of the non-planar guides.
   (d) Bore the fourth hole using the unoccupied non-planer guide.
V. $p^3$ pyramidal bonding
   (a) The same as (a) of IV.
   (b) (a) of V gives a pyramidal structure with angles between bonds of 108°26′. Other pyramidal structures can be achieved by setting the adjustable hole boring guide at the desired angles and boring three holes rotating the sphere 120° after each boring.
VI. $p^2$ linear bonding
   (a) The same as for the sp linear bond.
VII. p linear bonding
   (a) The same as for the s linear bond.
VIII. Distorted bonding
   Any type of distortion can be represented by use of the protractor and the adjustable hole boring guide.

It will be understood that various changes and modifications can be made in the described apparatus which provide the characteristics of this invention without departing from the spirit thereof particularly as defined in the following claims.

That which is claimed is:

1. In an apparatus for use in the production of models wherein a plurality of generally spherical elements formed of expanded plastic material are assembled to form a composite arrangement, the improvement comprising a jig for forming said spherical elements, said jig comprising a stationary base, a spherical element holding means situated on said base, pin means extending upwardly from the surface of said holding means whereby said spherical elements can be forced onto said holding means with said pins piercing the spherical elements for securing them in place, said holding means comprising a cup member rotatably mounted on said base, protractor means secured to said cup member for rotation therewith, and indicating means fixed on said base whereby the angular disposition of said cup member with respect to said base can be accurately determined, and a plurality of guide members mounted on said base in surrounding relationship relative to said holding means, cutting means adapted to be held by said guide members for cutting of said spherical elements whereby the elements are adapted to be secured together to form said composite arrangement.

2. An apparatus in accordance with claim 1 including inserts for said cup member whereby spherical elements of different diameters can be held in said cup member.

3. An apparatus in accordance with claim 1 wherein said cutting means comprises a boring tool adapted to bore holes in said spherical elements, said guide members serving to hold said tool and to align the tool with respect to said spherical elements.

4. An apparatus in accordance with claim 3 wherein a plurality of said guide members are radially arranged around said cup member, and wherein at least one of said guide members is provided with a plurality of positions for receiving a boring tool.

5. An apparatus in accordance with claim 3 wherein at least one of said guide members is movable about an axis perpendicular to the axis of rotation of said cup member.

6. An apparatus in accordance with claim 1 wherein said guide members comprise slotted members mounted on and extending upwardly from said base at a plurality of locations around said holding means, and wherein said cutting means comprise slicing means adapted to form flat surfaces on said spherical elements, said cup member of said holding means comprising a bottom wall and a semi-cylindrical upstanding wall, each spherical element held by said cup member being exposed at the open side of said semi-cylindrical wall to provide two portions for cutting by said slicing means, and wherein said protractor means comprises an extension of said bottom wall exposed outwardly of said semi-cylindrical wall.

References Cited

UNITED STATES PATENTS

| | | | |
|---|---|---|---|
| 2,006,074 | 6/1935 | Knight et al. | 269—53 |
| 2,730,801 | 1/1956 | Deedman et al. | 30—114 |
| 3,095,767 | 7/1963 | Jesonis | 77—62 |
| 3,108,501 | 10/1963 | Purdy | 77—63 |

OTHER REFERENCES

Publication: The Science Teacher, vol. 26, No. 5, pp. 361—363 (September 1959), article entitled "Tetrahedral Models," by W. E. Cowgill.

FRANCIS S. HUSAR, *Primary Examiner.*

U.S. Cl. X.R.

77—63; 35—18; 30—114; 269—53; 83—925, 1